United States Patent Office 3,714,148
Patented Jan. 30, 1973

3,714,148
PROCESS FOR PREPARING DIBENZAZOCINE
DERIVATIVES AND SALTS THEREOF
Tadashi Okamoto, Ashiya-shi, Tsuyoshi Kobayashi, Minoo-shi, and Hisao Yamamoto, Nishinomiya-shi, Japan, assignors to Sumitomo Chemical Co., Ltd.
No Drawing. Filed Oct. 10, 1969, Ser. No. 865,482
Claims priority, application Japan, Oct. 15, 1968, 43/75,446, 43/75,448; 43/75,449; Oct. 18, 1968, 43/76,380
Int. Cl. C07d 41/00, 57/00
U.S. Cl. 260—239 D    3 Claims

ABSTRACT OF THE DISCLOSURE 5,6 - dihydrodibenz[b,f]azocine derivatives of the formula

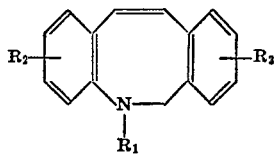

wherein $R_1$ is a hydrogen atom, a halo (lower) alkyl group or a group of the formula

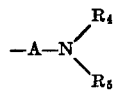

wherein A is a lower alkylene group, $R_4$ is a hydrogen atom or a lower alkyl group and $R_5$ is a lower alkyl group or a group of the formula

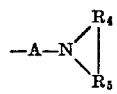

wherein $R_4$ and $R_5$ are as defined above and the ring structure

represents a 5 to 7-membered nitrogen-containing heterocyclic group, and $R_2$ and $R_3$ are each a hydrogen atom, a halogen atom, a lower alkyl group or a lower alkoxy group are prepared. A phenylthydrazine derivative of the formula

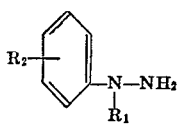

wherein $R_1$ and $R_2$ are each as defined above is reacted product having the formula

wherein $R_3$ is as defined above. The resulting reaction product having the formula

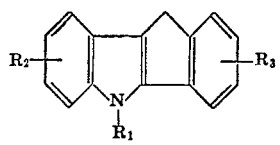

wherein $R_1$, $R_2$ and $R_3$ are each as defined above is treated with an oxidizing agent to form a resultant product of the formula

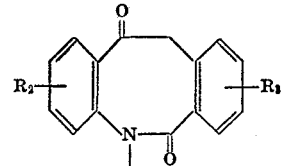

wherein $R_1$, $R_2$ and $R_3$ are each as defined above. This resultant product is treated with a metal hydride complex. The product in each step is, if necessary, subjected to haloalkylation, amination and/or aminoalkylation after the step.

The present invention relates to a process for preparing 5,6 - dihydrodibenz[b,f]azocine derivatives and salts thereof.

The 5,6 - dihydrodibenz[b,f]azocine derivatives are represented by the general formula

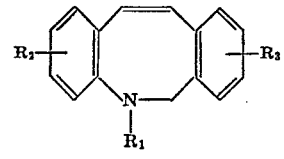  (I)

wherein $R_1$ is a hydrogen atom, a halo (lower) alkyl group (e.g. chloromethyl, 2-chloroethyl, 2-chloropropyl, 3-chloropropyl, 3-chlorobutyl, bromomethyl, 2-bromoethyl, 3-bromopropyl) or a group of the formula

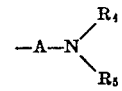

wherein A is a lower alkylene group (e.g. methylene, ethylene, trimethylene, propylene, tetramethylene), $R_4$ is a hydrogen atom or a lower alkyl group (e.g. methyl, ethyl, propyl, isopropyl) and $R_5$ is a lower alkyl group (e.g. methyl, ethyl, propyl, isopropyl) or a group of the formula

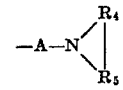

wherein $R_4$ and $R_5$ are as defined above and the ring structure

represents a 5 to 7-membered nitrogen-containing heterocyclic group (e.g. pyrrolidino, piperidino, piperazine, N-lower alkylpiperazino, morpholino), and $R_2$ and $R_3$ are each a hydrogen atom, a halogen atom (e.g. chlorine, bromine), a lower alkyl group (e.g. methyl, ethyl, propyl, isopropyl) or a lower alkoxy group (e.g. methoxy, ethoxy, propoxy, butoxy, the term "lower" being intended to mean a group having 1 to 5 carbon atoms.

Some of the compounds represented by the general Formula I wherein $R_1$ is a group of the formula

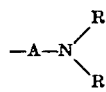

are known to be useful as anti-allergic, anticholinergic and analgesic agents (U.S. Pat. 3,448,102). However, these compounds are prepared only from expensive starting materials via multistep process affording unsatisfactory yields. In one step of the process a Beckmann rearrangement is utilized. The Beckmann rearrangement is essential to the process. In the step in which the Beckmann rearrangement is utilized, the production of two isomers is unavoidable. This is particularly so when the substituents present on each benzene ring differ from one another.

The present invention provides an improved process for preparing the 5,6-dihydrodibenz[b,f]azocine derivatives I, from more readily available starting materials, in fewer steps and in better yields as compared with the known process. It is particularly advantageous that only one main product is obtained in each step of the process.

In the process of this invention, there are included three essential steps, i.e. cyclic condensation, oxidative ring expansion and reductive dehydration. The order of these essential steps is substantially as follows (optional and/or necessary detour steps are omitted):

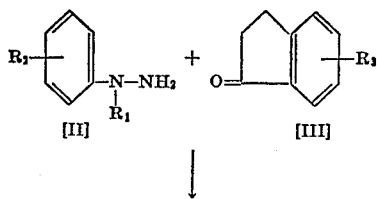

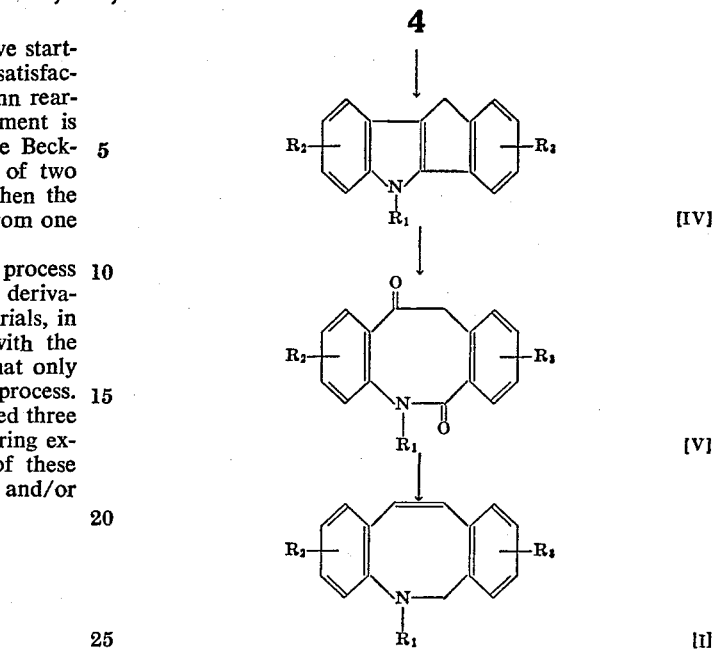

wherein $R_1$, $R_2$ and $R_3$ are each as defined above. One to three optional steps may also be included, i.e. haloalkylation, amination and aminoalkylation. All the essential and optional steps are shown in the following scheme:

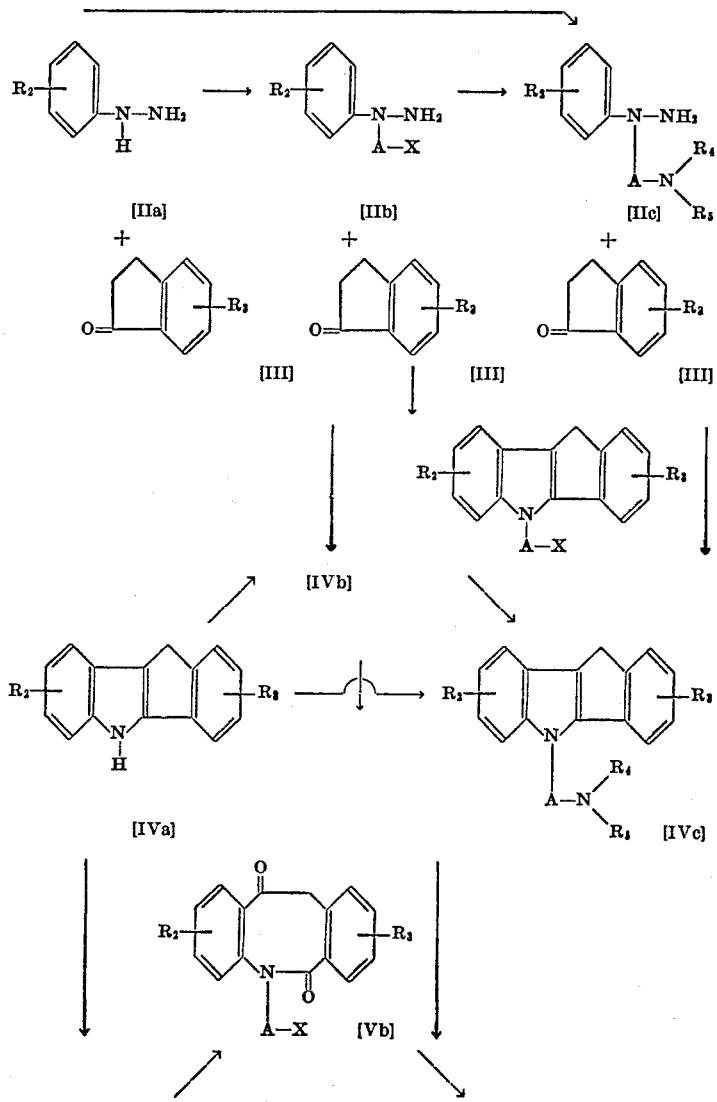

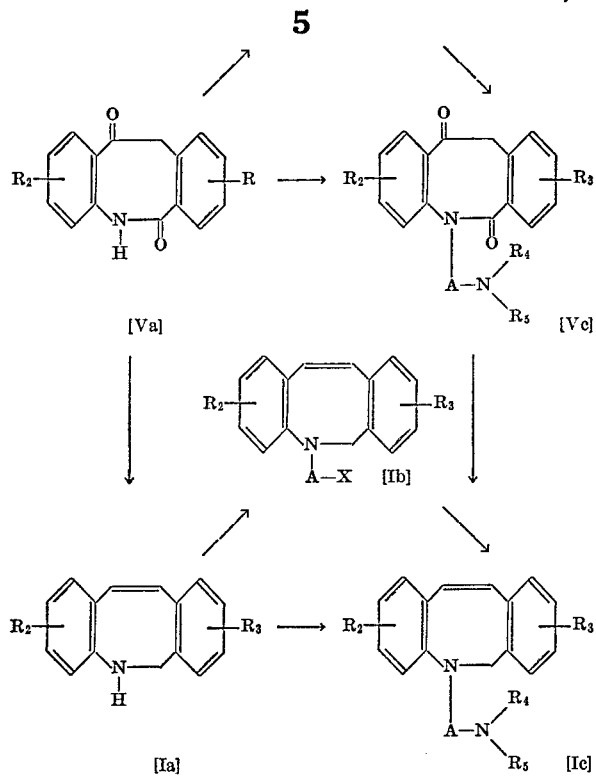

[Va] → [Vc]

↓ ↓

[Ib] A—X

↙ ↘

[Ia] → [Ic]

wherein $R_2$, $R_3$, $R_4$, $R_5$ and A are each as defined above and X is a halogen atom (e.g. chlorine, bromine).

The first essential step is concerned with the cyclic condensation of the phenylhydrazine derivative II, i.e. the compound IIa, IIb or IIc, with the indanone derivative III. The cyclic condensation reaction is carried out in the presence or absence of a condensing agent such as an acidic substance (e.g. hydrochloric acid, hydrobromic acid, phosphoric acid, polyphosphoric acid, acetic acid, zinc chloride), and preferably in a solvent (e.g. acetic acid, propionic acid, benzene, toluene, xylene, cyclohexane, dioxane, isopropyl ether, butanol, ethylene glycol, hydrochloric acid, sulfuric acid). The reaction temperature is from 40 to 250° C., preferably from 60 to 150° C. The reaction proceeds via the phenylhydrazone derivative of the formula

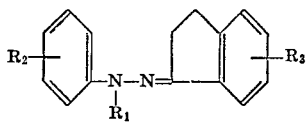

wherein $R_1$, $R_2$ and $R_3$ are each as defined above. Depending on the reaction conditions, the intermediate may be produced. However, the intermediate can be readily converted into the 5,10-dihydroindeno(1,2-b)indole derivative IV by heating it under the same conditions as above.

The second essential step is concerned with the oxidative ring expansion of the resultant 5,10-dihydroindeno-(1,2-b)indole derivative IV, i.e. the compound IVa, IVb or IVc. This oxidative ring expansion itself is entirely novel and unexpected from any known chemical reaction. The reaction is initiated by treating the resultant 5,10-dihydroindeno (1,2-b)indole derivative IV with an oxidizing agent (e.g. hydrogen peroxide, ozone, peracetic acid, perbenzoic acid), preferably in a solvent (e.g. acetic acid, methanol, ethanol, benzene, toluene, acetone, dioxane, water, chloroform). The reaction temperature may be from —50 to 200° C.

The third essential step is concerned with the reductive dehydration of the resulting 5,6,11,12-tetrahydrodibenz (b,f)azocine-6,12-dione derivative V, i.e. the compound Va or Vc. The reaction is effected by treating the 5,6,11,12-tetrahydrodibenz[b,f]azocine-6,12-dione derivative V with a metal hydride complex (e.g. lithium aluminum hydride, lithium alkoxyaluminum hydride, lithium dialkoxyaluminum hydride, lithium trialkoxyaluminum hydride) in a solvent (e.g. ether, tetrahydrofuran, dioxane), usually at a temperature of from —50 to 150° C.

Prior to, in the course of and/or subsequent to the above-mentioned essential steps, the starting compound or the product in each step may be optionally subjected to haloalkylation, amination and/or aminoalkylation.

Any one of the compounds IIa, IVa, Va and Ia can be haloalkylated. The haloalkylation reaction is carried out by treating the compound IIa, IVa, Va or Ia with a haloalkyl halide of the formula X'—A—X, wherein X' is a halogen atom (e.g. chlorine, bromine, iodine) and A and X are each as defined above, in the presence of a basic condensing agent (e.g. alkali metal, alkaline earth metal, alkali metal hydride, alkaline earth metal hydride, alkali metal amide, alkaline earth metal amide, alkali metal alkoxide, alkali metal carbonate, organic tertiary amine), and usually in a solvent (e.g. methanol, ethanol, ether, tetrahydrofuran, dioxane, benzene, dimethylformamide). If necessary, the starting compound IIa, IVa, Va or Ia may be previously converted into its alkali metal salt.

The amination is applicable to any one of the compounds IIb, IVb, Vb and Ib. The amination reaction is normally effected by treating the compound IIb, IVb, Vb or Ib with an amine of the formula

wherein $R_4$ and $R_5$ are each as defined above, if necessary, in the presence of a basic condensing agent such as an organic tertiary amine (e.g. triethylamine, pyridine, dimethylaniline) and in a solvent (e.g. benzene, toluene, dimethylformamide, ether, tetrahydrofuran).

Any one of the compounds IIa, IVa, Va and Ia can be aminoalkylated. The aminoalkylation reaction is ordinarily executed in substantially the same manner as the haloalkylation reaction; however, an aminoalkyl halide of the formula

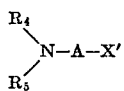

wherein $R_4$, $R_5$, A and X' are each as defined above, is used instead of the haloalkyl halide.

The thus prepared 5,6-dihydrodibenz[b,f]azocine derivatives I can be converted into their salts by means of a per se conventional procedure. Examples of the salts are hydrochloride, hydrobromide, sulfate, phosphate, maleate, tartrate, citrate, methoiodide, methobromide, etc.

Practical and presently-preferred embodiments of the present invention are illustratively shown in the following examples.

EXAMPLE 1

(A) Three drops of acetic acid are added to a solution of 25.1 g. of p-chlorophenylhydrazine and 23.3 g. of indanone in 100 ml. of ethanol. After refluxing for 15 minutes, the mixture is cooled. The resulting crystals are collected by filtration. 43.1 g. of indanone p-chlorophenylhydrazone are obtained which when recrystallized from ethanol are colorless crystals having a melting point of 166.5 to 168° C.

A mixture of 5 g. of indanone p-chlorophenylhydrazone and 70 ml. of conc. hydrochloric acid is refluxed for 10 minutes. After the mixture is cooled, water is added thereto. The resulting solid is collected by filtration and washed with water. Recrystallization from acetone-water (2:1) gives 7 - chloro - 5,10-dihydroindeno(1,2-b)indole having a melting point of 223 to 223.5° C.

(B) Three drops of acetic acid are added to a solution of 11.4 g. of $N^1$-(3-N,N-dimethylaminopropyl)-p-chlorophenylhydrazine and 7 g. of indanone in 100 ml. of ethanol. After refluxing for 20 minutes, the solvent is removed to give 18 g. of indanone $N^1$-(3-N,N-dimethylaminopropyl)-p-chlorophenylhydrazone as an oil.

A mixture of 10 g. of indanone $N^1$-(3-N,N-dimethylaminopropyl)-p-chlorophenylhydrazone and 100 ml. of conc. hydrochloric acid is refluxed for 15 minutes. After the reaction mixture is cooled, aqueous sodium carbonate is added thereto, and the mixture is extracted with ether. The ether layer is washed with water and dried over anhydrous sodium sulfate. The solvent is removed to give a reddish oil. 200 ml. of ether are added to the oil and gaseous hydrogen chloride is introduced therein. Deposited crystals are collected by filtration and recrystallized from ethanol to give 7-chloro-10-(3'-N,N-dimethylaminopropyl) - 5,10 - dihydroindeno(1,2-b)indole hydrochloride having a melting point of 236° C.

(C) A mixture of 3.5 g. of $N^1$-(2-N,N-diethylaminoethyl)-p-chlorophenylhydrazine dihydrochloride, 5 g. of indanone and 50 ml. of conc. hydrochloric acid is refluxed for 20 minutes. After the reaction mixture is cooled, aqueous sodium carbonate is added thereto, and the mixture is extracted with ether. The ether layer is washed with water and dried over anhydrous sodium sulfate. Gaseous hydrogen chloride is introduced therein. Deposited crystals are collected by filtration and recrystallized from isopropanol to give 7-chloro-10-(2'-N,N-diethylaminoethyl)-5,10-dihydroindeno(1,2-b)indole hydrochloride having a melting point of 225 to 226° C.

(D) A solution of 12 g. of 7-chloro-5,10-dihydroindeno(1,2-b)indole in 60 ml. of dimethylformamide is added to a mixture of 2.4 g. of 50% sodium hydride in 10 ml. of dimethylformamide. The mixture is stirred at 5° C. for 30 minutes. Then 6.5 g. of 3-N,N-dimethylaminopropyl chloride are added thereto and the mixture is stirred at 80° C. for 2 hours. Water is added to the reaction mixture, and the mixture is extracted with ether. The ether layer is washed with water and dried over anhydrous sodium sulfate and concentrated to give an oily product. The oily product is dissolved in 200 ml. of ether, and gaseous hydrogen chloride is introduced therein. Deposited pink colored crystals are recrystallized from ethanol to give 9.5 g. of 7-chloro-10-(3'-N,N-dimethylaminopropyl) - 5,10 - dihydroindeno(1,2-b)indole hydrochloride having a melting point of 236° C.

In like manner, there are obtained the following compounds: 10 - (3' - N,N-dimethylaminopropyl)-5,10-dihydroindeno(1,2-b)indole hydrochloride, M.P. 237 to 238° C. (from ethanol); 10-(2'-N,N-diethylaminoethyl)-7-chloro - 5,10-dihydroindeno(1,2-b)indole hydrochloride, M.P. 225 to 226° C. (from isopropanol), etc.

EXAMPLE 2

(A) Ozone is introduced into a mixture of 5 g. of 7-chloro - 10 - (3' - N,N-dimethylaminopropyl)-5,10-dihydroindeno (1,2-b)indole hydrochloride and 70 ml. of acetic acid. The mixture is stirred at 16 to 20° C. for 1.5 hours. Ice water is added to the reaction mixture, and the mixture is neutralized with aqueous sodium carbonate. The resulting crystals are extracted with chloroform. The chloroform layer is washed with water, dried over anhydrous sodium sulfate and concentrated to dryness. Recrystallization from ethanol-petroleum ether gives 2-chloro-5-(3' - N,N - dimethylaminopropyl)-5,6,11,12-tetrahydrodibenz[b,f]azocine-6,12-dione having a melting point of 159° C.

(B) 2.2 g. of 30% hydrogen peroxide are added to a solution of 4.45 g. of 7-chloro-10-(3'-N,N-dimethylaminopropyl) - 5,10 - dihydroindeno(1,2-b)indole hydrochloride in 20 ml. of acetic acid with stirring at 20° C. The reaction mixture is stirred at 20 to 27° C. for 3 hours, then poured into water. The resultant mixture is neutralized with aqueous sodium carbonate and extracted with chloroform. The chloroform layer is washed with water, dried over anhydrous sodium sulfate and concentrated to dryness. Recrystallization from ethanol-petroleum ether gives 2 - chloro - 5 - (3'-N,N-dimethylaminopropyl)-5, 6, 11, 12 - tetrahydrodibenz[b,f]azocine - 6,12 - dione having a melting point of 159° C.

(C) Gaseous dimethylamine is introduced into a solution of 4 g. of 5-(3'-chloropropyl)-5,6,11,12-tetrahydrodibenz[b,f]azocine-6,12-dione in 200 ml. of ethanol. The mixture is refluxed for 15 hours and the solvent is removed. Water is added to the residue and the resultant mixture is extracted with chloroform. The chloroform layer is washed with water, dried over anhydrous sodium sulfate and concentrated to dryness. Recrystallization from isopropanol gives 5 - (3' - N,N - dimethylaminopropyl)-5,6,11,12 - tetrahydrodibenz[b,f]azocine-6,12-dione having a melting point of 131 to 132° C.

In like manner, there are obtained the following compounds: 5 - (3' - N,N-dimethylaminopropyl)-5,6,11,12-tetrahydrodibenz[b,f]azocine - 6,12 - dione, M.P. 131 to 132° C. (from isopropanol); 2 - chloro - 5-(3'-N,N-dimethylaminopropyl) - 5,6,11,12 - tetrahydrodibenz[b,f] azocine-6,12-dione hydrochloride, M.P. 243 to 245° C., etc.

EXAMPLE 3

(A) A solution of 3.8 g. of 2-chloro-5-(3'-N,N-dimethylaminopropyl)-5,6,11,12 - tetrahydrodibenz[b,f]azocine-6,12-dione in 30 ml. of tetrahydrofuran is added at room temperature to a mixture of 1.25 g. of lithium aluminum hydride in 10 ml. of tetrahydrofuran. The reaction mixture is stirred under reflux for 1 hour. After the mixture is cooled, water is added dropwise thereto. The tetrahydrofuran layer is decanted off and concentrated to give a reddish oil. The oil is distilled under reduced pressure to give 2.8 g. of 2-chloro-5-(3'-N,N-dimethylaminopropyl)-5,6-dihydrodibenz[b,f]azocine as a yellow oil, B.P. 180 to 190° C./0.1 mm. Hg. An equimolar amount of gaseous hydrogen chloride is introduced into a soltuion of 2-chloro-5-(3'-N,N-dimethylaminopropyl)-5,6-dihydrodibenz[b,f]azocine in ether. Deposited crystals are collected by filtration and recrystallized from isopropanol to give 2-chloro-5-(3'-N,N-dimethylaminopropyl)-5,6-dihydrodibenz[b,f]azocine monohydrochloride having a melting point of 229 to 230° C. The introduction of excess gaseous hydrogen chloride into a solution of 2-chloro-5-(3'-N,N-dimethylaminopropyl)-5,6-dihydrodibenz[b,f]azocine in ether, followed by recrystallization of the deposited crystals from ethanol affords 2-chloro-5-(3'-N,N-dimethylaminopropyl) - 5,6 - dihydrodibenz[b,f]azocine dihydrochloride having a melting point of 193 to 194° C.

In like manner, there are obtained the following compounds: 5-(3'-N,N-dimethylaminopropyl)-5,6-dihydrodibenz[b,f]azocine monohydrochloride, M.P. 225 to 227° C. (from isopropanol); 5-(3'-N,N-dimethylaminopropyl)-5,6-dihydrodibenz[b,f]azocine dihydrochloride, M.P. 188 to 189° C. (from ethanol); 5-(2'-N,N-diethylaminoethyl)-5,6-dihydrodibenz[b,f]azocine dihydrochloride, M.P. 147 to 148° C. (from ethanol-ether); 5,6-dihydrodibenz[b,f]azocine, M.P. 108 to 109° C. (from petroleum benzene); 5-(2'-N,N-dimethylaminoethyl) - 5,6 - dihydrodibenz[b,f]azocine dihydrochloride, M.P. 166 to 168° C. (from ethanol), etc.

What is claimed is:

1. A process for preparing 5,6-dihydrodibenz[b,f]azocine derivatives of the formula:

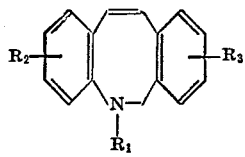

wherein $R_1$ is a hydrogen atom, haloethyl or halopropyl, a group of the formula:

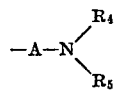

wherein A is ethylene or propylene, $R_4$ is a hydrogen atom or a lower alkyl group and $R_5$ is a lower alkyl group, or a group of the formula: —A—$NR_6$ wherein A is as defined above and the structure —$NR_6$ is selected from the group consisting of pyrrolidino, piperidino, piperazino, N-lower alkylpiperazino and morpholino, and $R_2$ and $R_3$ are each a hydrogen atom, a halogen atom or a lower alkyl group which consists essentially of reacting a phenylhydrazine derivative of the formula:

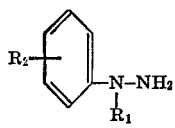

wherein $R_1$ and $R_2$ are each as defined above with an indanone derivative of the formula:

wherein $R_3$ is as defined above to form a reaction product of the formula:

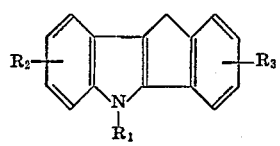

wherein $R_1$, $R_2$ and $R_3$ are each as defined above, treating said reaction product with an oxidizing agent selected from the group consisting of hydrogen peroxide, ozone, peracetic acid and perbenzoic acid to form a resultant product of the formula:

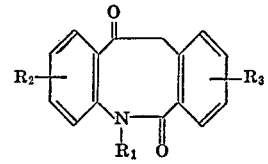

wherein $R_1$, $R_2$ and $R_3$ are each as defined above, and treating said resultant product with a metal hydride complex selected from the group consisting of lithium aluminum hydride, lithium alkoxyaluminum hydride, lithium dialkoxyaluminum hydride and lithium trialkoxyaluminum hydride.

2. A process for preparing 5,6-dihydrodibenz[b,f]azocine derivatives of the formula:

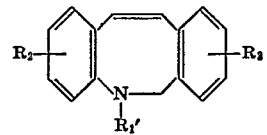

wherein $R_1'$ is a group of the formula:

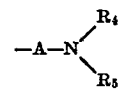

wherein A is ethylene or propylene, $R_4$ is a hydrogen atom or a lower alkyl group and $R_5$ is a lower alkyl group, or a group of the formula: —A—$NR_6$ wherein A is as defined above and the structure —$NR_6$ is selected from the group consisting of pyrrolidino, piperidino, piperazino, N-lower alkylpiperazino and morpholino, and $R_2$ and $R_3$ are each a hydrogen atom, a halogen atom or a lower alkyl group which consists essentially of reacting a phenylhydrazine derivative of the formula:

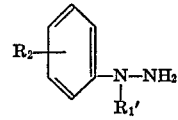

wherein $R_1'$ and $R_2$ are each as defined above with an indanone derivative of the formula:

wherein $R_3$ is as defined above to form a reaction product of the formula:

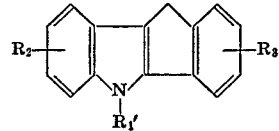

wherein $R_1'$, $R_2$ and $R_3$ are each as defined above, treating said reaction product with an oxidizing agent selected from the group consisting of hydrogen peroxide, ozone, peracetic acid and perbenzoic acid to form a resultant product of the formula:

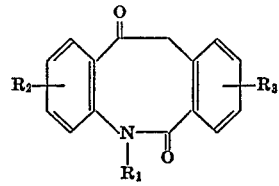

wherein $R_1'$, $R_2$ and $R_3$ are each as defined above, and treating said resultant product with a metal hydride complex selected from the group consisting of lithium aluminum hydride, lithium alkoxyaluminum hydride, lithium dialkoxyaluminum hydride and lithium trialkoxyaluminum hydride.

3. A process for preparing 5,6-dihydrodibenz[b,f]azocine derivatives of the formula:

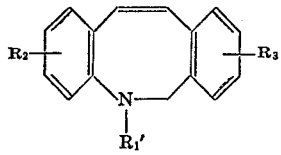

wherein $R_1'$ is a group of the formula:

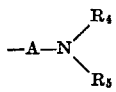

wherein A is ethylene or propylene, $R_4$ is a hydrogen atom or a lower alkyl group and $R_5$ is a lower alkyl group, or a group of the formula: $-A-NR_6$ wherein A is as defined above and the structure $-NR_6$ is selected from the group consisting of pyrrolidino, piperidino, piperazino, N-lower alkylpiperazino and morpholino, and $R_2$ and $R_3$ are each a hydrogen atom, a halogen atom or a lower alkyl group which consists essentially of reacting a phenylhydrazine derivative of the formula:

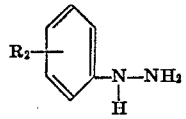

wherein $R_2$ is as defined above with an indanone derivative of the formula:

wherein $R_3$ is as defined above to form a reaction product of the formula:

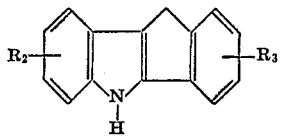

wherein $R_2$ and $R_3$ are each as defined above, reacting said reaction product with an aminoalkyl halide of the formula: $R_1'-X$ wherein R' is as defined above and X' is a halogen atom to form a resulting product of the formula:

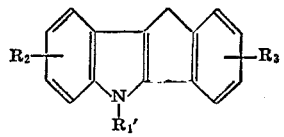

wherein $R_1'$, $R_2$ and $R_3$ are each as defined above, treating said resulting product with an oxidizing agent selected from the group consisting of hydrogen peroxide, ozone, peracetic acid and perbenzoic acid to form a resultant product of the formula

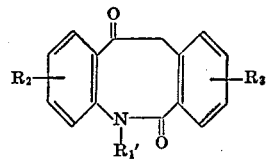

wherein $R_1'$, $R_2$ and $R_3$ are each as defined above, and treating said resultant product with a metal hydride complex selected from the group consisting of lithium aluminum hydride, lithium alkoxyaluminum hydride, lithium dialkoxyaluminum hydride and lithium trialkoxyaluminum hydride.

References Cited
UNITED STATES PATENTS

| | | | |
|---|---|---|---|
| 3,448,102 | 6/1969 | Yale et al. | 260—239 |
| 3,036,064 | 5/1962 | Schindler | 260—239 |
| 3,144,440 | 8/1964 | Schindler et al. | 260—239 |

OTHER REFERENCES

Nakazaki et al., Chem. Abstracts, vol. 57, col. 15055 (1962).

Witkop et al., J. Am. Chem. Soc., vol. 73, pp. 2641–2647 (1951).

Giovannini et al., Helv. Chim. Acta, vol. 40, pp. 2287–2291 (1957).

ALTON D. ROLLINS, Primary Examiner

U.S. Cl. X.R.

260—239.3 T, 247.5 R, 268 R, 268 TR, 268 PC, 293.59, 293.79, 313.1, 326.3 CA, 326.81, 326.9, 566 B, 569